Aug. 15, 1933.  F. R. CARR  1,922,568

HUB AND BRAKE DRUM ASSEMBLY FOR VEHICLE WHEELS

Filed May 18, 1932  2 Sheets-Sheet 1

Inventor
Frank R. Carr

By Clarence A. O'Brien
Attorney

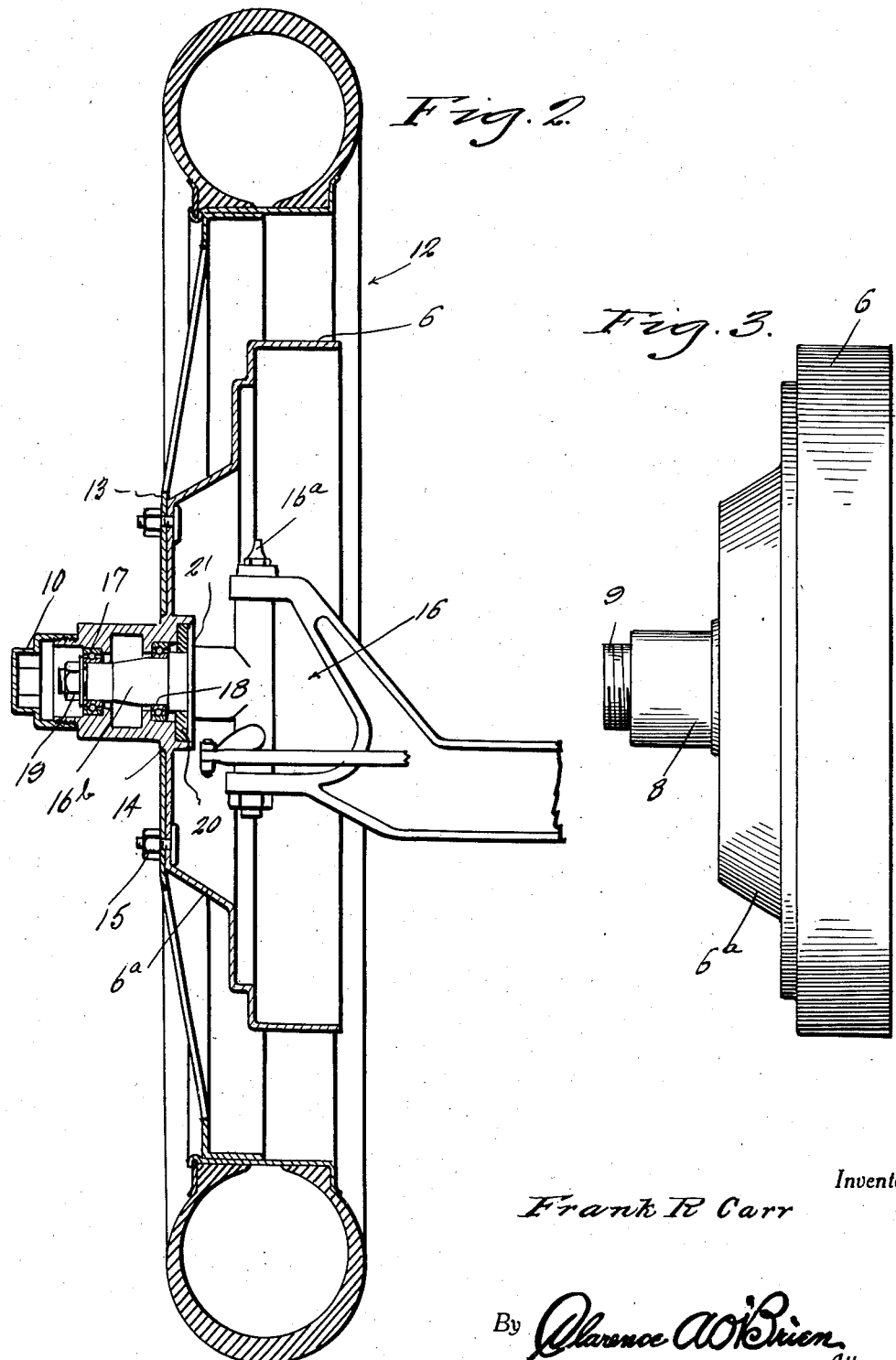

Patented Aug. 15, 1933

1,922,568

UNITED STATES PATENT OFFICE 1,922,568

HUB AND BRAKE DRUM ASSEMBLY FOR VEHICLE WHEELS

Frank R. Carr, Nashville, Tenn.

Application May 18, 1932. Serial No. 612,113

1 Claim. (Cl. 301—6)

This invention relates broadly to vehicular wheels and has particular reference to a brake drum and hub assembly for the vehicle wheels.

In accordance with the present invention a vehicle wheel having a novel hub and brake drum assembly is provided whereby provision is made for mounting a vehicular wheel on the steering knuckle in such a manner that the spindle bolt is in substantially perfect alinement with the center of the tread of the vehicle tire, so that all road shock is absorbed by the spindle with the result that vibration in the steering column will be eliminated; wheel "shimmying" eliminated; and untoward movement of the vehicle, as usually results when a "blow out" of a tire occurs, is effectively guarded against.

The invention together with its numerous objects and advatages will be best understood from a study of the following description, taken in connection with the accompanying drawings wherein:

Figure 2 is a sectional view taken on line 2—2 of Figure 1, Figure 2 being on an enlarged scale.

Figure 3 is an elevational view of the combined brake drum and hub.

Figure 1:
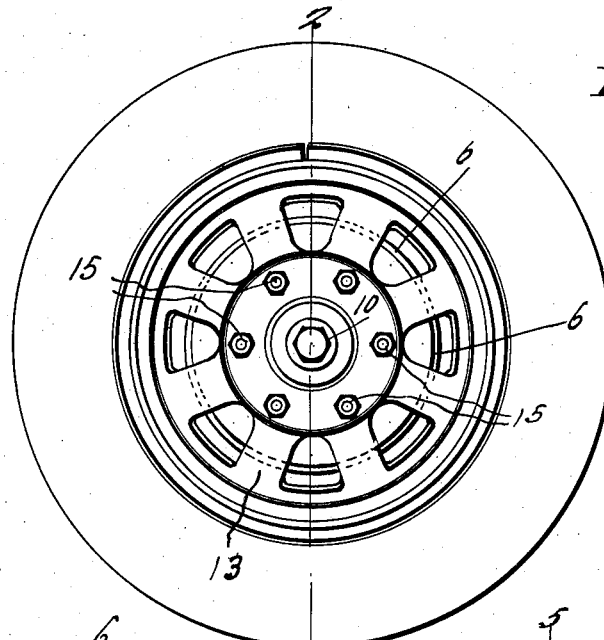
Figure 1 is a side elevational view of a vehicular wheel embodying the features of the present invention.
Figure 5:
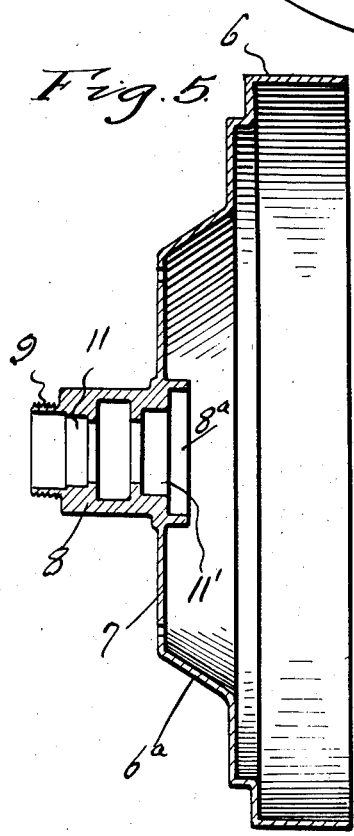
Figure 5 is a sectional view taken on the line 5—5 of Figure 4.
Figure 4:
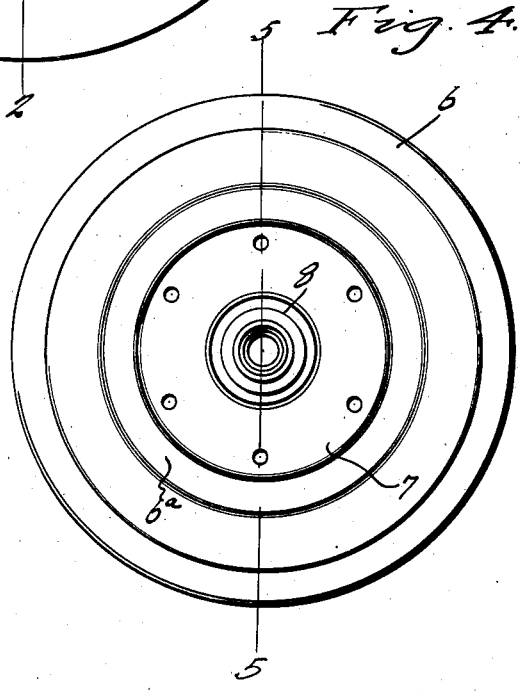
Figure 4 is a plan view of the combined brake drum and hub.

In accordance with the present invention a brake drum 6 is provided, and the same in the preferred embodiment thereof is of three diameters with the wall of the smallest diameter 6a sloping to an end plate or wall 7 forming part of the drum. Integral with the wall 7 of the drum is a hub 8 which same comprises a cylindrical body having an opening therethrough and at its outer end being reduced and externally threaded as at 9 for accommodating a hub cap 10 as suggested in Figure 2. The hub 8 extends inwardly of the drum and at its inner end is provided with a circular recess 8a; and said hub 8 is also provided internally thereof with a pair of relatively spaced annular shoulders dividing the hub into a bearing chamber 11 adjacent the outer end of the hub and a bearing chamber 11' adjacent the chamber or recess 8a.

In the drawings I have shown the invention as applied to a vehicular wheel 12 of the disk type although it is to be understood that the invention is susceptible of application to vehicular wheels of the artillery or other suitable type.

As shown the vehicle wheel 12 is hubless and the body or disk 13 of the wheel is provided with a centrally located aperture 14.

In accordance with the present invention the drum 6 is placed at the inboard side of the wheel and the wall 7 of the drum is bolted or otherwise secured as at 15 to the center portion of the wheel disk 13; while the hub 8 projects outwardly through the aperture 14 in said wheel disk.

In the drawings I have also shown the wheel mounted on the steering knuckle of a vehicle, the steering knuckle being designated generally by the reference character 16. The steering knuckle 16 includes among other parts the usual spindle bolt 16a and the spindle 16b. As is well known the spindle 16b is received within the hub 8 and bearings 17, 18, are provided for the spindle and are arranged in the chambers or recesses 11, 11'. On the outer end of the spindle is provided the usual bolt 18 while a washer 20 is disposed about the sleeve and arranged within the recess or chamber 8a being retained therein by the usual shoulder 21 provided on said spindle sleeve as shown in Figure 2 and well known in the art.

As also shown in Figure 2 when the wheel embodying the features of the present invention is finally mounted, the spindle bolt 16 will be in direct alinement with the center of the tread of the pneumatic tire, and in actual practice it has been found that with the spindle bolt so arranged relative to the tread of the tire, that "shimmying" is reduced to a minimum, as is also vibration of the steering column, which vibration usually occurs when the vehicle is travelling at a rapid rate of speed, say forty five miles per hour.

Even though I have herein shown and described the preferred embodiment of the invention, it is to be understood that the same is susceptible of further changes, modifications and improvements coming within the scope of the appended claim.

Having thus described my invention, what I claim as new is:

In combination, a spindle, a bolt for said spindle, a brake drum mounted on said spindle, having an integral outwardly extending hub portion, the side walls of said brake drum being formed of a plurality of offset, spaced, annular portions of different diameters, a vehicular wheel secured to the side wall of said drum, said hub having said spindle extending therein with the bolt of the spindle in substantial alignment with the tread of the tire of the vehicular wheel.

FRANK R. CARR.